United States Patent
Bublewitz et al.

(10) Patent No.: US 12,433,826 B2
(45) Date of Patent: Oct. 7, 2025

(54) PRIMER AND KIT OF PRIMER AND DENTAL MATERIAL

(71) Applicant: Kettenbach GmbH & Co. KG, Eschenburg (DE)

(72) Inventors: Alexander Bublewitz, Herborn (DE); Tobias Weller, Gießen (DE); Christian Suchomski, Lohra-Kirchvers (DE)

(73) Assignee: KETTENBACH GMBH & CO. KG, Eschenburg (DE)

( * ) Notice: Subject to any disclaimer, the term of this patent is extended or adjusted under 35 U.S.C. 154(b) by 601 days.

(21) Appl. No.: 17/436,799

(22) PCT Filed: Mar. 11, 2020

(86) PCT No.: PCT/EP2020/056567
§ 371 (c)(1),
(2) Date: Sep. 7, 2021

(87) PCT Pub. No.: WO2020/182918
PCT Pub. Date: Sep. 17, 2020

(65) Prior Publication Data
US 2022/0168190 A1    Jun. 2, 2022

(30) Foreign Application Priority Data

Mar. 11, 2019    (DE) .................. 102019106119.9

(51) Int. Cl.
| | |
|---|---|
| A61K 6/30 | (2020.01) |
| A61K 6/61 | (2020.01) |
| A61K 6/62 | (2020.01) |
| A61K 6/64 | (2020.01) |
| A61K 6/79 | (2020.01) |
| A61K 6/887 | (2020.01) |

(52) U.S. Cl.
CPC . *A61K 6/62* (2020.01); *A61K 6/79* (2020.01)

(58) Field of Classification Search
None
See application file for complete search history.

(56) References Cited

U.S. PATENT DOCUMENTS

| | | | | |
|---|---|---|---|---|
| 4,966,934 A | * | 10/1990 | Huang | ............. C09J 4/00 |
| | | | | 522/27 |
| 10,307,343 B2 | | 6/2019 | Bublewitz | |
| 2016/0262987 A1 | * | 9/2016 | Bublewitz | ........ A61K 6/61 |

FOREIGN PATENT DOCUMENTS

| | | |
|---|---|---|
| DE | 102015034327 A1 | 9/2016 |
| DE | 102015103427 A1 | 9/2016 |

OTHER PUBLICATIONS

International Preliminary Report on Patentability and Written Opinion for corresponding application No. PCT/EP2020/056567, dated Sep. 23, 2021.

* cited by examiner

*Primary Examiner* — Brian Gulledge
(74) *Attorney, Agent, or Firm* — McDonnell Boehnen Hulbert & Berghoff LLP

(57) ABSTRACT

The invention relates to an aqueous dental single-component primer composition as well as a kit with this primer composition and a composite. The primer composition according to the present invention is self-etching and self-undercoating. It comprises a polymerizable (meth)acrylate or (meth)acrylamide monomer with (i) at least one acidic group such as for example a phosphoric acid group and with (ii) at least one hydrophilic group such as for example a terminal hydroxy group or two polymerizable (meth)acrylate or (meth)acrylamide monomers, wherein one thereof comprises (i) at least one acidic group and one thereof comprises (ii) at least one hydrophilic group. In addition, at least one of the polymerizable (meth)acrylate or methylacrylamide monomers comprises (i) a polyfunctionality, preferably an at least threefold polyfunctionality, particularly preferably a 3-, 4-, 5-, 6-, 7-, 8-, 9- or 10-fold polyfunctionality and/or (ii), or a further polymerizable (meth)acrylate or methylacrylamide monomer (iii) with a polyfunctionality, preferably an at least three-fold polyfunctionality, particularly preferably a 3-, 4-, 5-, 6-, 7-, 8-, 9- or 10-fold polyfunctionality is contained. This polyfunctionality inheres in the capability to polymerize. In particularly, at least three, preferably terminal, (meth)acrylate, (meth)acrylamide and/or allyl groups are present. Furthermore, this primer composition is characterized by the absence of a photoinitiator, a polymerization catalyst, in particular a polymerization catalyst on the basis of vanadium as well as by the absence of an organic solvent.

22 Claims, No Drawings

PRIMER AND KIT OF PRIMER AND DENTAL MATERIAL

TECHNICAL FIELD

The present invention relates to a primer for binding dental restoratives to dentin and/or dental enamel comprising a polymerizable (meth)acrylate or (meth)acrylamide monomer (i) of at least one acidic group such as for example a phosphoric acid group and with (ii) at least one hydrophilic group such as for example a terminal hydroxy group, or two polymerizable (meth)acrylate or (meth)acrylamide monomers, wherein one thereof comprises (i) at least one acidic group and one thereof comprises (ii) at least one hydrophilic group, wherein one of the polymerizable (meth)acrylate or (meth)acrylamide monomers (i) and/or (ii) or a further contained polymerizable (meth)acrylate or (meth)acrylamide monomer comprises (iii) a 3-, 4-, 5-, 6-, 7-, 8-, 9-, 10-polyfunctionality, in particularly in the form of preferably terminal, (meth)acrylate, (meth)acrylamide and/or allyl groups, and which contains neither a photoinitiator nor a vanadium compound as polymerization catalyst, in particularly in the form of a metalorganic vanadium compound, e.g., vanadyl(V) derivatives, or aromatic amines or an organic solvent.

BACKGROUND

In the therapeutic treatment for the restoration of destroyed natural tooth substance often polymerizable dental materials are used. Decisive for the quality of the result of the restored tooth is that the esthetic requirements as well as the functional requirements are met. From an esthetic point of view, therefore, these dental materials must be visually indistinguishable from natural tooth substance. But, in addition, they must also be sufficiently hard and the build-up materials used must be fixed at the natural tooth parts in such a way that the applied dental materials can withstand the high forces to which they are exposed during chewing.

The polymerizable dental materials used to build up missing tooth structure are usually referred to as core build-up materials. Preferably, hydrophobic methacrylate monomers are used in these materials. In practical use in the dental surgery, it has been shown to be favorable, when these core build-up materials are available in pasty form so that the dentist can build up and model them in the mouth of the patient. Such a model is usually applied in several layers and after the application it is cured layer by layer, thus polymerized. However, this procedure is very time-consuming due to the multiple curing steps.

Besides the build-up of missing tooth structures, polymerizable dental materials are also used in so-called polymerizable composite cements. These cements are used for the luting fixation of dental crowns and other dental replacement materials.

Finally, polymerizable dental materials are also used as so-called bulk fill composites. Here, tooth cavities, thus voids created after caries has been removed, are filled with the material.

As already described, one of the various requirements concerning the polymerizable dental material is that a strong connection must be established between applied material and natural tooth substance, guaranteeing stability for many years under the considerable mechanical requirements. By the use of adhesives (dental bonding agents) such an adhesion can be achieved, wherein the adhesives on the tooth substance lead to a better wetting and thus also to a better adhesion of the applied material. Usually, three different mechanisms of action are required for this purpose. In the first generation, therefore, such adhesives comprised three components, which initiated different mechanisms of action in three steps, chronologically one after the other.

In a first step, by means of the first component an etching of the natural tooth substance is conducted, which roughens the surface of the natural tooth substance, in particularly also the dental enamel. For the inner tooth substance, in particularly the dentin, this means that by the etching it is achieved that minerals are dissolved out of the collagen composite of the natural tooth substance, so that substantially the collagen fibers remain on the tooth surface. For the first step, usually, 35% by weight of phosphoric acid has been used, which is applied to the natural tooth substance. Subsequently, the acid has to be removed by rinsing with water and then drying with air.

In a second step, then, the adhesion between applied dental material and natural tooth substance has to be ensured. For this purpose, the etched tooth surface is coated with a so-called primer. This one usually contains hydrophilic monomers which can penetrate into the exposed collagen-fiber composite. Usually, the primer has to be cured.

In a third step, then, it has to be ensured that there is sufficient adhesion between primer and polymerizable dental material. This poses a problem insofar as the primer comprises hydrophilic monomers, such as described, but the dental material comprises hydrophobic monomers. Therefore, a further coating, a so-called bonding, must first be applied to achieve a sufficient adhesion between polymerizable dental material and natural tooth substance.

A particular disadvantage of the method described is the long treatment time due to the three separate steps. In addition, the different substances have to be stored in different packaging, and the risk of contamination and confusion is increased.

In the past, products have already been developed which combine one or more of the above-mentioned steps in one substance or one substance mixture, so that at least one step is omitted. In a typical variant, at first, etching is carried out and then a product is applied which comprises both, hydrophilic and hydrophobic monomers, and therefore combines the function of primer and bonding.

In another variant, the etching can be combined with the primer, which is usually carried out in such a way that the hydrophilic monomers of the primer have phosphoric acid groups that (slightly) etch the natural tooth substance. Subsequently, the substance required for the bonding is applied separately.

A further development of the adhesives described above are the so-called all-in-one adhesives, also called "one-step adhesives" or one-step adhesion promoters. These comprise all three steps described above in one single step, so that a single substance combines the functions of etchant, primer and bonding. This results in a considerable saving of time for the treating dentist and the patient. However, this advantage comes at the price of the disadvantage that the monomers containing phosphoric acid groups do not only (slightly) etch the natural tooth substance, but also subsequently react with the polymerizable dental material to be applied, so that the curing of core build-up material, cement or bulk fill composite may be disturbed. Here, amine co-initiators are protonated and thus inactivated.

This is in particularly important, because the curing of the polymerizable dental materials is also a complex process in itself: On the one hand, the polymerizable dental materials to be applied must already be able to cure at moderate temperatures, since the use takes place in the oral cavity of the patient. Therefore, redox initiators are usually used, which accelerate the curing process at temperatures of around 37° C. Typically, a redox initiator system is used which comprises a percompound together with a co-initiator. Here, the percompound is present as so-called catalyst paste in a first paste and the co-initiator in the so-called base paste in a second paste. In the case of use, dental compound and co-initiator are brought together by mixing the pastes so that a redox reaction takes place which provides the radicals required for the polymerization of the organic monomers which are contained in the dental material. Usually, the pastes are stored separately from each other to ensure a high storage stability.

An example for such dental materials with an initiator system of inorganic peroxides, for example sodium or potassium peroxide sulfate in combination with an alkali or alkaline earth toluene sulfinate or an alkali or alkaline earth sulfite can be found in WO 2014/033280 A1.

In an alternative, also light-curing dental materials containing a photoinitiator can be used. The disadvantage here is that the treating dentist has to apply these materials in thin layers, because the irradiated light cannot penetrate into deeper layers of the dental material. By modeling single individual layers and curing them again and again with light in the meantime, the treatment time is considerably extended.

When all-in-one adhesives and the described polymerizable dental materials with redox initiator are used for the treatment, in regular cases, insufficient polymerization at the interface of adhesives and dental material occurs. This is in particularly due to the already described effect, according to which the phosphoric acid groups contained in the all-in-one adhesive protonate the amines which are used as co-initiator, so that they are converted into an ammonium compound. As a result, the actually desired redox reaction of the original amines with the per compounds to initiate the polymerization reaction is prevented, and insufficient curing occurs at the interface of adhesive and polymerizable dental material. In summary, therefore, all-in-one adhesives usually result in a reduced adhesion of the dental material on the adhesive.

In order to improve the adhesive effect between tooth substance and polymerizable dental material with redox initiator by means of an all-in-one adhesive, in EP 2 409 997 A1 a composition is described which penetrates into the tooth substance and uses the moisture contained in the tooth substance for achieving an accelerated curing of the dental material. The composition described comprises a monomer mixture, an inorganic peroxide, a reducing agent and other polymerization accelerators. The polymerization accelerator is dissolved by the moisture on the surface of the tooth substance, which improves the polymerization curing at the adhesion interface and within the curable composition. Examples of such an accelerator are sulfites, but also ammonium salts such as the tetramethylammonium salt and the tetraethylammonium salt of benzenesulfonic acid. Usually, the polymerization accelerator is present in the base paste.

EP 1 780 223 B1 describes an adhesive for the dental field, wherein a polymerization accelerator, namely a water-soluble sulfite, is added as additional co-initiator. The sulfite is dispersed in the polymerizable monomer and dissolved by moisture in the tooth at the interface with the natural tooth substance. The additional reducing effect of the sulfite accelerates the curing of the polymerizable dental material at the interface between adhesive and polymerizable dental material.

EP 2 554 154 A1 describes an adhesive and a curable composition in the form of a core build-up material with a high adhesion and resistance. Here, the adhesive comprises a monomer mixture, water and an amine-based, sulfur-free reducing agent.

The core build-up material also comprises a monomer mixture, a water-soluble, sulfur containing reducing agent, an organic peroxide and an amine-based, sulfur-free reducing agent.

Finally, DE 10 2015 103 427 describes a composition which should ensure that sufficient curing occurs, both, within the polymerizable dental material and at the interface with adhesives, in particularly all-in-one adhesives.

Nevertheless, with all these uses of an adhesive, also an all-in-one adhesive and the polymerizable dental material, the problem remains that the adhesive must be cured after its application. This still means not only for the patient a relatively long treatment time, but also a time-consuming preparative procedure for the using dentist.

Therefore, it is an object of the present invention to provide a primer onto which directly the polymerizable dental material can be applied. In particularly, it is an object to provide a kit of primer and polymerizable dental material which is precisely harmonized with each other, and thus ensures a simplified processing and very good adhesion conditions at the same time.

SUMMARY

This object is solved by a primer with the features of patent claim 1.

Such an aqueous primer composition is self-etching and self-undercoating. It comprises a polymerizable (meth)acrylate or (meth)acrylamide monomer with (i) at least one acidic group such as for example a phosphoric acid group and with (ii) at least one hydrophilic group such as for example a terminal hydroxy group or two polymerizable (meth)acrylate or (meth)acrylamide monomers, wherein one thereof comprises (i) at least one acidic group and one thereof comprises (ii) at least one hydrophilic group. In addition, at least one of the polymerizable (meth)acrylate or methylacrylamide monomers comprises (i) a polyfunctionality, preferably an at least threefold polyfunctionality, particularly preferably a 3-, 4-, 5-, 6-, 7-, 8-, 9- or 10-fold polyfunctionality and/or (ii) a further polymerizable (meth)acrylate or methylacrylamide monomer (iii) with a polyfunctionality is contained. Preferably, this polyfunctionality is an at least three-fold polyfunctionality, particularly preferably a 3-, 4-, 5-, 6-, 7-, 8-, 9- or 10-fold polyfunctionality. This polyfunctionality inheres in the capability to polymerize. In particular, at least three, preferably terminal, (meth)acrylate, (meth)acrylamide and/or allyl groups are present. Furthermore, this primer composition is characterized by the absence of the following substances: photoinitiators, vanadium compounds as polymerization catalysts, in particular in the form of metalorganic vanadium compounds, e.g., vanadyl(V) derivatives, aromatic amines, as well as of sulfinates and sulfonates, in particularly aromatic sulfonates such as for example sodium-4-toluene sulfonate. In addition, the primer composition according to the present invention is characterized by the absence of an organic solvent.

In the sense of the invention, the term polyfunctionality relates to the capability to polymerize and thus to the cross-linking density. For example, a monomer with a 3-polyfunctionality comprises three polymerizable groups.

DETAILED DESCRIPTION

This composite composition has the ability that reducing agent (sodium sulfite) (which) can start a polymerization reaction by diffusing into the primer composition claimed after its application. Therefore, the polymerization is no longer started by a catalyst and/or an initiator which is contained in the composition itself, but, rather, it is based on material transport, in particularly diffusion-based. Thus, for the dentist it is possible, also without the risk of early curing, to prepare the tooth for the application of the dental material, subsequently to apply the dental material and to achieve in one single step a curing of the whole system.

Furthermore, by the addition of a polymerization catalyst (copper and/or iron compound) in the primer composition and/or of an inorganic, water-soluble oxidizing agent (e.g., sodium persulfate) in the composite composition the curing can be accelerated and the adhesive bond at the interface between primer and composite as well as primer and tooth substance can be improved.

In addition, it has been shown to be favorable, when iron and/or copper compounds are added. Preferably, here, iron is in the oxidation state +II or +III and copper is in the oxidation state +I or +II.

The iron compounds can be inorganic iron compounds such as in particularly iron halogenides, iron sulfates, iron nitrates, iron perchlorates, iron phosphates, iron pyrophosphates, iron tetrafluoroborates and/or iron thiocyanates. Also metalorganic iron compounds such as in particularly iron acetylacetonates, iron carboxylates such as, e.g., iron 2-ethylhexanoates, iron acetates, iron oxalates, iron ethylenediamine tetraacetates, iron citrates, iron phthalocyanines, iron gluconates, iron ascorbates, iron lactates, iron fumarates, iron tartrates, iron methacrylates and/or iron alkoxides are possible.

In the same manner, inorganic copper compounds such as in particularly copper halogenides, copper sulfates, copper nitrates, copper perchlorates, copper phosphates, copper pyrophosphates, copper tetrafluoroborates and/or copper thiocyanates can be used. This is also valid for metalorganic copper compounds such as in particularly copper acetylacetonates, copper carboxylates such as, e.g., copper 2-ethylhexanoates, copper acetates, copper oxalates, copper ethylenediamine tetraacetates, copper citrates, copper phthalocyanines, copper gluconates, copper ascorbates, copper lactates, copper fumarates, copper tartrates, copper methacrylates and/or copper alkoxides.

Surprisingly, here, it has also been found that it is possible to achieve very good adhesion values for the claimed systems, which still endure even after artificially imitated aging processes.

In particularly, the adhesion values also after a thermocycling, in particular after a thermocycling which is described in detail with respect to the embodiment examples, are still above a value of >10 MPa with a variance of 4 MPa. Particularly preferably, such a system has an adhesion value of >12 MPa with a variance of 4 MPa. Especially preferred is a system in which the adhesion value does not deviate by more than a variance of 4 MPa.

In the sense of the invention, the term (meth)acrylamide group and the term (meth)acrylate group are to be understood such that both, methacrylamide groups and acrylamide groups and also methacrylate groups and acrylate groups, are meant.

With respect to the monomers used, on the one hand, it is possible to use a single monomer which comprises both, a polyfunctionality, in particularly 3-, 4-, 5-, 6-, 7-, 8-, 9- or 10-fold polymerizable (meth)acrylate or (meth)acrylamide groups, and also an acidic, optionally also an additional hydrophilic group. Here, in particularly, it has also to be distinguished that an acidic group can at the same time always also be understood as hydrophilic group. The preferred example for that is:

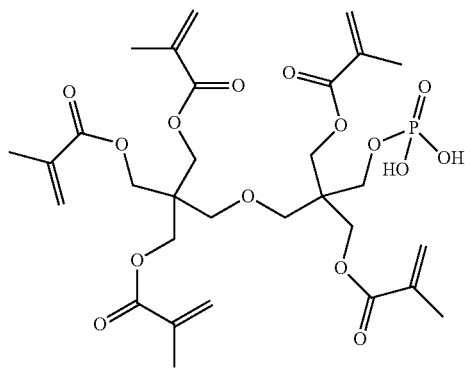 [SMILES: C=C(C)C(=O)OCC(COCC(COC(=O)C(=C)C)(COC(=O)C(=C)C)COP(=O)(O)O)(COC(=O)C(=C)C)COC(=O)C(=C)C]

dipentaerythritol penta(meth)acrylate phosphate (PENTA)

In this case, the acidic group at the same time has also to be understood as hydrophilic group.

Examples of monomers which in addition also still comprise an additional hydrophilic group are 1-mono(methacrylate)-1-phosphoric acid-1-hydroxy trimethylolethane or -propane or also sorbitol tri(meth)acrylate monophosphoric acid monohydroxide.

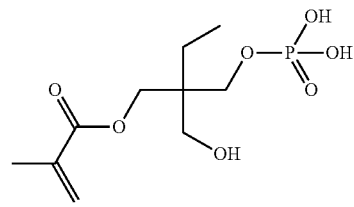 [SMILES: C=C(C)C(=O)OCC(CC)(CO)COP(=O)(O)O]

[2-(hydroxymethyl)-2-(phosphonooxymethyl)butyl]-2-methylprop-2-enoate

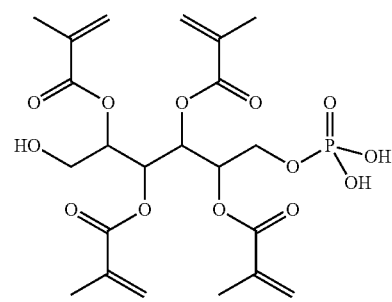 [SMILES: C=C(C)C(=O)OC(CO)C(OC(=O)C(=C)C)C(OC(=O)C(=C)C)C(COP(=O)(O)O)OC(=O)C(=C)C]

[1-(hydroxymethyl)-2,3,4-tris(2-methylprop-2-enoyloxy)-5-phosphonooxypentyl]-2-methylprop-2-enoate Furthermore, it is possible that two monomers are present, wherein the monomer which comprises the polyfunctionality in addition comprises an acidic or a hydrophilic group, whereas, then, the second monomer each comprises at least one functionality in the form of an acidic or a hydrophilic group.

Finally, it is still possible that three different monomers are used, namely one with the decisive polyfunctionality, one with the acidic group and one with the hydrophilic group.

Here, the principal structure of all monomers used is a result of the consideration that a backbone, the so-called spacer group is provided. On this spacer group, then, the respective groups are present. Here, the following table shows the preferred backbone structures, and by X the respective positions of the functional groups are shown. Here, X can mean the same group, but also different groups $R_1$ to $R_n$.

| Exemplary backbone structures | Structure |
| --- | --- |
| glycerin | X⁀⁀X, X |
| trimethylolpropane | X, X, X |
| pentaerythritol | X, X, X, X |
| xylitol | X, X, X, X, X |
| triglycerol | X, X, X, X, X, X |
| dipentaerythritol | X, X, X, X, X, X |
| sorbitol | X, X, X, X, X, X |

Furthermore, cyclic aromatic hydrocarbons, cycloalkanes, aliphatic polyethers, PEG, PPG, PTMEG, paraformaldehyde and alkanes can be used as spacers.

Typically, the connection between the backbone, the so-called spacer, and functional groups can be realized by a connecting group, the so-called linking element. This, in particularly, can be (a) carboxylic acid ester, urethane and/or amide groups.

Therefore, a polyfunctional monomer with, for example, a trifunctionality as well as an additional hydrophilic group has the following structure:

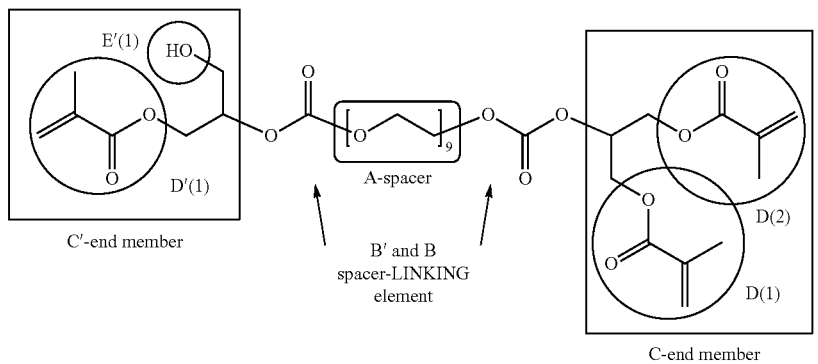

As functional groups in the sense of polyfunctionality, in particularly, styrene, methacrylic, acrylic, allyl, methacrylamide and/or acrylamide groups in arbitrary combination are to be understood. These groups can radically be polymerized.

As acidic group in the sense of the invention, in particularly, carbonate, sulfate, sulfonate, sulfinate, phosphate, phosphonate, phosphinate groups are to be understood, or that a monomer is selected as at least one monomer from the group containing 4-META (4-(2-methacryloxyethoxycarbonyl)phthalic acid anhydride),

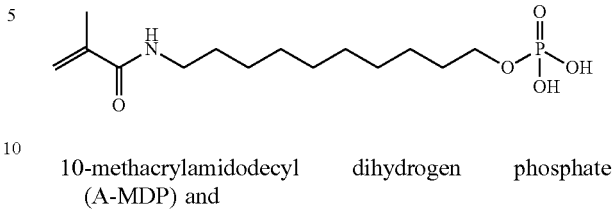

10-methacrylamidodecyl dihydrogen phosphate (A-MDP) and

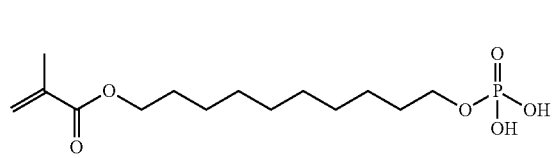 [SMILES: C=C(C)C(=O)OCCCCCCCCCCOP(=O)(O)O]

MDP (10-methacryloyloxydecyl dihydrogen phosphate), or also MAC (carboxylic acid substituted MDP),

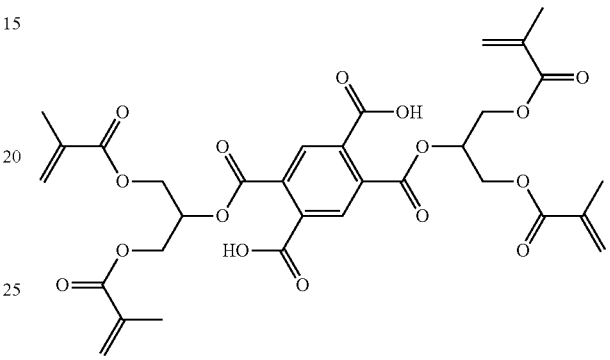

PMGDM (pyromellitic acid-bis-glycerin dimethacrylate). These ensure a sufficient (slight) etching of the tooth substance.

As hydrophilic group in the sense of the invention, at least, a hydroxyl, an amino, an amin, a thiol, a hydrochloride or a polyether group are to be understood. With respect to the hydrophilic groups it has been shown to be particularly favorable, when the hydrophilic group is an n-linked hydroxyl or an n-linked amin or a main chain-linked polyether group, because so its functionality is increased.

Here, particularly preferably,

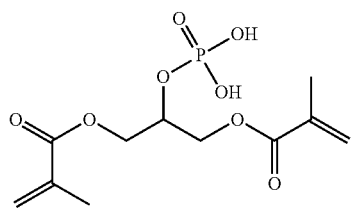 [SMILES: C=C(C)C(=O)OCC(COC(=O)C(=C)C)OP(=O)(O)O]

PENTA (dipentaerythritol penta(meth)acrylate phosphate),

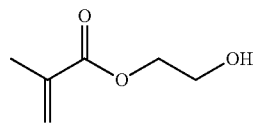

2-hydroxyethyl methacrylate (HEMA) is used.

Preferably, the primer composition claimed is a single-component composition, because so it is possible to keep the handling for the dentist as simple as possible.

In addition, in a preferred embodiment of the invention, the pH value of the mixture of the monomers is ≤3.5, preferably ≤2.5 and particularly preferably between 1.5 and 2.5. But, in any case, favorably, the lower limit is not necessarily ≥1.5.

In an embodiment according to the present invention, the portion of a polyfunctional monomer is between 0.1 and 10% by weight, preferably between 1 and 5% by weight, whereby a particularly good polymerization is guaranteed.

In a preferred embodiment, the composition according to the present invention comprises a portion of 15 to 35% by weight, preferably 20 to 30% by weight of MDP (GDMAP, 4-META, A-MDP, PMGDM), a portion of 0.05 to 5% by weight, preferably 0.05 to 2% by weight of BHT, a portion of 0.05 to 0.5% by weight, preferably 0.1 to 5% by weight

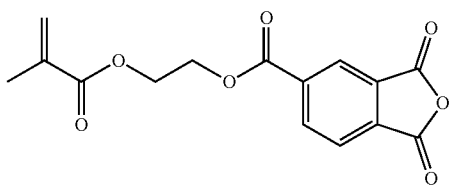 [SMILES: C=C(C)C(=O)OCCOC(=O)c1ccc2c(c1)C(=O)OC2=O]

GDMAP (1,3-glycerol dimethacrylate phosphate), of 2-dimethylaminoethyl methacrylate (DMAEMA), hydroquinone monomethyl ether (MEHQ), pyrocatechol derivatives and/or HALS (sterically hindered amines) and a portion of 25 to 35% by weight, preferably 27 to 33% by weight of water (preferably deionized). In addition, a portion of 0.05 to 10% by weight, preferably 1 to 5% by weight of the polyfunctional monomer which particularly advantageously is trimethylpropane trimethacrylate (glycerolpropoxy triacrylate), pentaerythritol trimethacrylate, sorbitol pentamethacrylate GENOMER*® 4691, N,N-diallyl methacrylamide, N,N-iso-valerylidene-bis-methacrylamide is added. The portion of HEMA (N-2-hydroxyethyl methacrylamide), N-(2-hydroxypropyl) methacrylamide corresponds to the difference to 100% by weight.

In this connection it is particularly important that the polyfunctional monomer used is soluble in the containing mixture. In particularly, it is soluble in a mixture of water with the monomer with an acidic group and/or the monomer with the hydrophilic group. Especially preferably, it is soluble in a mixture of water, MDP or one of its derivatives and HEMA or one of its derivatives, especially preferably in the above-mentioned quantity ratios.

In addition, at least one inorganic or organic peroxide compound may be contained. Preferably, the peroxygen compound is a peroxide, a peroxide ester, a diacyl peroxide, a dialkyl peroxide, a peroxyketal, a peroxyketone, a hydroperoxide or hydrogen peroxide.

In a preferred embodiment, the organic peroxygen compound is a diacyl peroxide, in particular a benzoyl peroxide, preferably dibenzoyl peroxide. Further examples of suitable peroxides comprise m-toluoyl peroxide, 2,5-dimethyl-2,5-bis(benzoyl peroxide)hexane, tert-butylperoxy-2-ethylhexanoate and tert-butylperoxy isopropyl carbonate. Examples of suitable peroxide esters comprise tert-butylperoxy benzoate and bis-tert-butylperoxy isophthalate. Examples of suitable dialkyl peroxides comprise dicumyl peroxide, di-tert-butyl peroxide and lauroyl peroxide. Examples of suitable peroxyketals comprise 1,1-bis(tert-butylperoxy)-3,3,5-trimethylcyclohexane, 1,1-bis(tert-butylperoxy)cyclohexane and 1,1-bis(tert-hexylperoxy)cyclohexane. Examples of suitable peroxy ketones comprise methylethylketone peroxide, cyclohexanone peroxide and methylacetoacetate peroxide. Examples of suitable hydroperoxides comprise tert-butyl hydroperoxide, cumene hydroperoxide and p-diisopropylbenzene peroxide.

Preferably, the primer according to the present invention contains one or more additives, preferably buffer salts, metal scavengers, surfactants, active ingredients, flavoring agents and/or odorants, fluoridation agents, bleaching substances, desensitizers, adhesive bond promoters, dyes, color pigments, indicators, further initiators or initiator components, stabilizers, polymerization inhibitors, thixotropic aids as well as antibacterial substances or combinations of two or more thereof.

Furthermore, it is an object of the invention also to provide a kit in which a primer according to the present invention is used together with a pasty two-component composite, and thus optimum adhesion results can be achieved.

Such a kit comprises besides the described primer a polymerizable dental material. The polymerizable dental material contains at least one catalyst paste (A) and at least one base paste (B). The catalyst paste comprises at least one organic peroxygen compound and at least one filler. The base paste contains at least one radically polymerizable organic (meth)acrylic monomer, at least one filler, one co-initiator of the radical polymerization and at least one salt-like, water-soluble and powdery reducing agent which is dispersed in the base paste (B) (in the following also: reducing agent). Furthermore, in the at least one catalyst paste and/or the at least one base paste at least one phase transfer catalyst is provided which is an ammonium, a phosphonium and/or a sulfonium salt which contains an inorganic or organic anion, preferably with the exception of anions of the sulfinic acids or the sulfonic acids.

By the use of a phase transfer catalyst according to the present invention the adhesion on the tooth substance is improved. This can be explained by the fact that the salt-like, water-soluble and powdery reducing agent is dissolved at the interface to the primer and then can diffuse in at the interface between composite and primer by the phase transfer catalyst, for achieving also there an acceleration of the polymerization by reaction with the peroxygen compound. Due to the division of the polymerizable dental material into at least one catalyst paste and at least one base paste, a high storage stability is achieved. By the mixing of these individual components the polymerizable dental material is created which under the conditions in the mouth (corresponding temperature and moisture) quickly cures.

Preferably, the portion of the phase transfer catalyst in the catalyst paste and/or the base paste, based on the total mass of the catalyst paste and/or the base paste, is 0.01 to 5% by weight, preferably 0.01 to 2% by weight, particularly preferably 0.05 to 1% by weight and especially preferably 0.05 to 0.5% by weight. The mentioned weight portion of the phase transfer catalyst in the catalyst paste and/or the base paste, based on the total mass of the catalyst paste and/or the base paste, has to be chosen so low that the curing of the polymerizable dental material is not so quick that a processing of the dental material is complicated or even prevented. At the same time, the mentioned weight portion has to be chosen so high that the polymerization of the dental material within the dental material bulk is accelerated as intended.

According to a preferred embodiment of the invention, the phase transfer catalyst is contained in the catalyst paste. With respect to the storage stability, this has shown to be particularly favorable, because so a potential activation of the reducing agent which is present in the base paste with the phase transfer catalyst and a subsequent reaction of the reducing agent with oxygen from air, as described above, can be prevented.

For further stabilization drying agents can be added. Examples of drying agents for this purpose comprise: silica gel, zeolites, alumina, calcium oxide, calcium sulfate, potassium carbonate, potassium hydroxide, copper sulfate and/or sodium hydroxide. Examples of bases comprise: sodium hydroxide, calcium hydroxide, calcium oxide.

According to the present invention, a reducing agent is a substance which in combination with the peroxygen compound forms a redox system which is suitable for initiating a radical polymerization of the polymerizable (meth)acrylic monomer. In addition, the reducing agent impairs a reaction of a radical, growing polymer chain with the diradical oxygen which may result in the termination of the polymerization reaction by a reaction of the reducing agent after dissolution with the oxygen.

In the sense of the present invention, water-soluble substance means that a substance has a solubility of at least 10 g/L, preferably at least 15 g/L, particularly preferably at least 30 g/L and especially preferably at least 50 g/L in distilled water at a temperature of 25° C.

Preferably, the reducing agent is selected from the group of the sulfites, in particular from the group of the alkali metal sulfites, alkaline earth metal sulfites, $(NH_4)_2SO_3$, hydrogen sulfites, disulfites, thiosulfites, thionates and dithionites. Particularly preferably, as reducing agent sodium sulfite is used. The mentioned reducing agents have shown to be particularly suitable for the present invention, because they have a low solubility in the organic monomer and they are present in the base paste in a dispersed form, but they can particularly well be introduced into the organic monomer by the phase transfer catalyst which is used according to the present invention.

The weight portion of the reducing agent, based on the total mass of the at least one base paste, is preferably less than 10% by weight, particularly preferably less than 5% by weight, particularly preferably less than 3% by weight and especially preferably (2±1) % by weight.

In the at least one base paste, a co-initiator is provided which independently of the reducing agent is suitable for initiating a polymerization reaction of the organic (meth) acrylic monomer with the peroxygen compound.

Preferably, the co-initiator is selected from the group of the primary, secondary and/or tertiary amines, in particular the secondary amines and/or the tertiary amines. Examples of suitable secondary amines and/or suitable tertiary amines comprise o-tolyl diethanolamine, m-tolyl diethanolamine, p-tolyl diethanolamine, N-methylaniline, N,2-dimethylaniline, N,3-dimethylaniline, N,4-dimethylaniline, ethyl 2-methylaminobenzoate, ethyl 3-methylaminobenzoate, ethyl 4-methylaminobenzoate, ethyl 2-dimethylaminobenzoate, ethyl 3-dimethylaminobenzoate, ethyl 4-dimethylaminobenzoate, methyl-2-anisidine, methyl-3-anisidine, methyl-4-anisidine, N,N-dimethyl-o-toluidine, N,N-dimethyl-m-toluidine and/or N,N-dimethyl-p-toluidine.

The weight portion of the co-initiator used, based on the total mass of the at least one base paste, is preferably less than 5% by weight, particularly preferably less than 2% by weight, particularly preferably less than 1.5% by weight, but, in any case, also more than (0.1±0.05) % by weight, preferably (0.8±0.05) % by weight.

Preferably, the peroxygen compound is a peroxide, a peroxide ester, a diacyl peroxide, a dialkyl peroxide, a peroxyketal, a peroxyketone or a hydroperoxide. Decisive for the used peroxygen compound is that the peroxygen compound in combination with the reducing agent and the co-initiator forms a redox system which is suitable for the initiation of a radical polymerization of the organic (meth) acrylic monomer. In other words, it is necessary that the redox potentials of the peroxygen compound and the reducing agent and/or the co-initiator are adjusted to each other such that a redox reaction takes place between both and that during this radicals are formed which start a polymerization of the (meth)acrylic monomer.

In a preferred embodiment, the organic peroxygen compound is a diacyl peroxide, in particular a benzoyl peroxide, preferably dibenzoyl peroxide.

Further examples of suitable peroxides comprise m-toluoyl peroxide, 2,5-dimethyl-2,5-bis(benzoyl peroxide) hexane, tert-butylperoxy-2-ethylhexanoate and tert-butylperoxy isopropyl carbonate. Examples of suitable peroxide esters comprise tert-butyl peroxybenzoate and bis-tert-butyl peroxyisophthalate. Examples of suitable dialkyl peroxides comprise dicumyl peroxide, di-tert-butyl peroxide and lauroyl peroxide. Examples of suitable peroxyketals comprise 1,1-bis(tert-butylperoxy)-3,3,5-trimethylcyclohexane, 1,1-bis(tert-butylperoxy)cyclohexane and 1,1-bis(tert-hexylperoxy)cyclohexane. Examples of suitable peroxyketones comprise methylethylketone peroxide, cyclohexanone peroxide and methylacetoacetate peroxide. Examples of suitable hydroperoxides comprise tert-butyl hydroperoxide, cumene hydroperoxide and p-diisopropylbenzene peroxide.

The weight portion of the peroxygen compound, based on the total mass of the at least one catalyst paste, is preferably less than 5% by weight, particularly preferably less than 2% by weight, particularly preferably less than 1% by weight and especially preferably (1.0±0.2) % by weight.

The mentioned redox initiator systems can also be supplemented with at least one further initiator system. So, for example, at least one photoinitiator or at least one thermally activatable radical starter, for example azo compounds, can be provided in the polymerizable dental material. These additional initiator systems can be provided in the at least one catalyst paste and/or the at least one base paste. A person skilled in the art knows such initiator classes.

A preferably provided photoinitiator allows for the practitioner anytime an early curing with a polymerization lamp. Normally, for the light curing of dental materials photoinitiator systems of camphor quinone and an aromatic amine are used. In the case of irradiation with blue light with a wavelength in the range of 470 nm such a mixture generates radicals which completely cure the material within a time period of less than one minute. The photoinitiator may be present in the catalyst paste and/or the base paste.

Suitable as photoinitiators are, for example, alpha-diketones such as camphor quinone, in particularly D,L-camphor quinone, in connection with secondary and tertiary amines and optionally mono- and bisacylphosphine oxides, such as 2,4,6-trimethylbenzoyl diphenylphosphine oxide and bis-(2, 6-dichlorobenzoyl)-4-n-propylphenylphosphine oxide and benzaldehydes, Ivocerin, BAPO, TPO, etc.

The weight portion of the preferably used photoinitiator, based on the total mass of the at least one base paste and/or the at least one catalyst paste, is preferably less than 1% by weight, particularly preferably less than 0.5% by weight, particularly preferably less than 0.2% by weight and especially preferably (0.09±0.04) % by weight.

In particularly for the use of the polymerizable dental material as core build-up material and as polymerizable composite cement it is preferable, when both, a redox initiator system and a photoinitiator, are provided. Such polymerizable dental materials are also referred to as dual-curing ones.

In a preferred embodiment of the invention, the (meth) acrylic monomer is selected from the group of the acrylamides and/or the acrylates and/or methacrylates (in summary called (meth)acrylates). Here, both, bi- or higher functional acrylic acid and methacrylic acid esters or monofunctional (meth)acrylic acid esters can be provided.

The preferably used radically polymerizable organic (meth)acrylic monomers include aromatic groups containing acrylates or methacrylates, aliphatic groups containing acrylates or methacrylates, polyether groups containing acrylates or methacrylates, polyester groups containing acrylates or methacrylates, polyurethane groups containing acrylates or methacrylates or combinations of two or more of these monomers.

Examples of suitable (meth)acrylates comprise bisphenol A di(meth)acrylate, bis-GMA (an addition product of methacrylic acid and bisphenol A diglycidyl ether), ethoxylated bisphenol A di(meth)acrylate, UDMA (an isomer mixture of di-2-methacryloxyethyl-2,2,4-trimethylhexamethylene dicarbamate and di-2-(meth)-acryl-oxyethyl-2,3,3-trimethylhexamethylene dicarbamate), trimethylolpropane trimethacrylate (TMPTMA), isobornyl methacrylate (IBMA), 2-hydroxyethyl methacrylate (HEMA) and/or gylcerin-1,3-dimethacrylate (GDMA), as well as ethyl (meth)acrylate, isopropyl (meth)acrylate, n-butyl (meth)acrylate, isobutyl (meth)acrylate, tetrahydro-furfuryl (meth)acrylate, glycidyl (meth)acrylate, 2-methoxyethyl (meth)acrylate, 2-ethoxy-ethyl (meth)acrylate, 2-methoxy-ethyl (meth)acrylate, 2-ethyl-hexyl (meth)acrylate, 2-hydroxy-1,3-di(meth)acry-loxy-propane, neopentylglycol di(meth)acrylate, 1,3-butanediol di(meth)acrylate, 1,4-butanediol di(meth)acrylate, 1,6-hexanediol di(meth)acrylate, 1,8-octanediol di(meth)acrylate, 1,10-decanediol di(meth)acrylate, 1,12-dodecanediol di(meth)acrylate, 1,14-tetra-decanediol di(meth)acrylate, 1,16-hexa-decanediol di(meth)acrylate, trimethylolpropane tri(meth)acrylate, trimethylolethane tri(meth)acrylate, pentaerythritol tri(meth)acrylate, dipentaerythritol penta(meth)acrylate, dipentaerythritol hexa(meth)acrylate, trimethylolmethane tri(meth)acrylate, pentaerythritol tetra (meth)acrylate, tetraethylene glycol di(meth)acrylate, mono- or polyethylene glycol di(meth)acrylate, e.g., ethylene glycol di(meth)acrylate, diethylene glycol di(meth)acrylate and triethylene glycol di(meth)acrylate, mono- or polypropylene glycol di(meth)acrylate and mono- or polybutylene glycol di(meth)acrylate, in particularly mono- or polytetramethylene glycol di(meth)acrylate, wherein the polyalkylene glycol derivatives comprise both, such ones with branched and also such ones with linear structure.

In addition, (meth)acryles with urethane bond(s) are enclosed as examples of mixture components for the mentioned (meth)acryles. Suitable examples comprise di-2-(meth)acryloxyethyl-2,2',4-trimethylhexamethylene dicarbamate, di-2-(meth)acryloxyethyl-2,4,4'-trimethylhexamethylene dicarbamate and 1,3,5-tris[1,3-bis{(meth)acryloyloxy}-2-propoxycarbonylamino-hexane]-1,3,5-(1H,3H,5H)triazine-2,4,6-trion. In addition, for example, a (meth)acrylate of an urethane oligomer derived from 2,2'-di(4-hydroxy-cyclohexyl)propane, 2-oxepanone, hexamethylene diisocyanate and 2-hydroxy-ethyl (meth)acrylate and a (meth)acrylate of an urethane oligomer derived from 1,3-butanediol, hexamethylene diisocyanate and 2-hydroxy-ethyl (meth)acrylate are mentioned. These (meth)acrylates can be used alone or as a mixture of two or more in combination with the polymerizable dental material.

The phase transfer catalyst is selected from the group of the ammonium salts, the phosphonium salts and/or the sulfonium salts with inorganic or organic anions, wherein anions of the sulfinic acids and anions of the sulfonic acids are excluded. The salts used can be both, water containing salts and also water-free salts.

Suitable examples of heterocyclic ammonium salts comprise N-(allyloxycarbonyloxy)succinim, 3-benzyl-5-(2-hydroxyethyl)-4-methyl-thiazolium chloride, 1-butyl-2,3-dimethylimidazolium chloride, 1-butyl-2,3-dimethylimidazolium hexafluorophosphate, 1-butyl-2,3-dimethylimidazolium tetrafluoroborate, 1,3-didecyl-2-methylimidazolium chloride, 1-ethyl-2,3-dimethylimidazolium ethyl sulfate, 3-ethyl-5-(2-hydroxyethyl)-4-methylthiazolium bromide, hexacylpyridinium bromide, hexadecylpyridinium chloride, 5-(2-hydroxyethyl)-3,4-dimethylthiazolium iodide, 1-methylimidazolium hydrogen sulfate, methyl viologen dichloride and 1,2,3-trimethylimidazolium salts.

Also commercially available phase transfer catalysts can be used in the present invention. Suitable examples comprise Aliquat® 336, a quaternary ammonium salt, wherein $R_1$ is methyl and $R_2$, $R_3$ and $R_4$ are octyl and/or decyl, wherein in particularly octyl is present, or Arquad® 2HT-75.

Examples of preferred anions are anions selected from the group of the halogenides, the hydroxides, anions of inorganic acids, anions of organic acids, with the exception of anions of sulfinic acids and anions of sulfonic acids, pseudohalogen anions or halogen complexes of aluminate, silicate, phosphate or arsenate.

Particularly preferred anions are fluoride, chloride, bromide, iodide, hydroxide, sulfate, hydrogen sulfate, dihydrogen phosphate, phosphate, phosphonate, borate, chlorate, perchlorate, nitrite, nitrate, hydrogen carbonate, carbonate, tetrafluoroborate, tetrachloroaluminate, hexafluorosilicate, hexachlorophosphate, hexafluoroarsenate, formate, acetate, butyrate, fumarate, maleate, glutarate, lactate, malate, malonate, oxalate, pyruvate or tartrate.

It has been shown that the following anions are particularly favorable: hydrogen sulfate, sulfate, dihydrogen phosphate, chloride and tetrafluoroborate.

As fillers for the catalyst paste and the base paste inorganic or organic materials can be used. The fillers can be reinforcing fillers or non-reinforcing fillers or mixtures thereof.

As reinforcing fillers in particularly highly disperse, active fillers having a BET surface of at least 50 $m^2/g$ are suitable. Particularly suitable are such ones having a single particle size in the nanometer range which may be present as aggregates and/or agglomerates. Preferred reinforcing fillers are substances which are selected from the group consisting of aluminum hydroxide, zinc oxide, titanium dioxide, zirconium oxide, silicon dioxide as well as precipitated and/or pyrogenic silicic acid. Of course, the above-mentioned compounds can be used singly or in arbitrary combination with each other, and namely also in hydrophilic as well as also in hydrophobized form.

Further preferably, the at least one reinforcing filler is present in the form of nanoparticles, as fibrous or leaf-like filler, for example as fibrous mineral filler or as fibrous synthetic filler.

The portion of reinforcing filler in the dental material according to the present invention is normally 0.1 to 80% by weight, preferably 0.5 to 50% by weight and particularly preferably 1 to 40% by weight, based on the whole dental material.

In principle, as non-reinforcing fillers the same substances as for the reinforcing fillers are suitable, wherein the non-reinforcing fillers however necessarily have a BET surface of less than 50 $m^2/g$ (Technical Bulletin Pigmente Degussa Kieselsäuren, number 12, page 5 as well as number 13, page 3). Preferred non-reinforcing fillers are substances which are selected from the group consisting of alkaline earth metal oxides, alkaline earth metal hydroxides, alkaline earth metal fluorides, alkaline earth metal carbonates, calcium apatite ($Ca_5[(F, Cl, OH, ½CO_3)|(PO_4)_3]$, in particularly calcium hydroxyl apatite ($Ca_5[(OH)|(PO_4)_3]$, titanium dioxide, zirconium oxide, aluminum hydroxide, silicon dioxide, precipitated silicic acid, calcium carbonate and dental glasses (barium, strontium, aluminum, fluoride). In particular, in the case of bisphenol A-free monomer compositions which are also free of aromatics, in the composite non-reinforcing fillers having a refractive index of less than 1.55 are preferred.

In particularly, in the case of bulk fill composites grain sizes of less than or equal to 1.5 µm are preferred.

Of course, the above-mentioned compounds can be used singly or in arbitrary combination with each other, and namely also in hydrophilic as well as also in hydrophobized form.

Preferably, the non-reinforcing fillers used have a mean grain size of higher than 0.1 µm (Ullmann Enzyklopädie der Technischen Chemie, volume 21, page 523).

The portion of non-reinforcing filler in the dental material according to the present invention is normally 0.1 to 80% by weight, preferably 0.5 to 50% by weight and particularly preferably 1 to 40% by weight, based on the whole dental material.

The total portion of reinforcing and non-reinforcing fillers in the dental material according to the present invention is normally 0.1 to 80% by weight, preferably 0.5 to 80% by weight, particularly preferably 1 to 75% by weight and especially preferably 5 to 70% by weight, based on the whole dental material.

Furthermore, also larger amounts of selected X-ray opaque fillers can be present in the at least one base paste and/or the at least one catalyst paste. Preferably, these fillers are an irregularly shaped or spherical $YbF_3$ or $YF_3$ powder with a mean grain size of the primary particles of 40 nm to 1.5 μm, and particularly preferably core-shell combination products consisting of $YF_3$ or $YbF_3$ core and $SiO_2$ shell, wherein especially preferably the surface of the $SiO_2$ shell is silanized. In particularly, such a core-shell combination product has a refractive index of 1.48 to 1.54, a mean grain size of the agglomerated particles of between 0.5 and 5 μm, measured with a particle size measuring laser diffraction instrument SALD-2001 (Schimadzu), and a specific BET surface of 2 $m^2/g$ to 5 $m^2/g$, measured with a Tristar 3000 instrument from Micromeritics. Here, the refractive index of the core-shell combination product consisting of $YbF_3$ core and $SiO_2$ shell is between 1.52 and 1.54.

Preferably, the at least one base component and/or the at least one catalyst component contains one or more additives, preferably buffer salts, water scavengers, metal scavengers, metal complexing agents, further paste formers, surfactants, active ingredients, substances enabling optical scanning, flavoring agents and/or odorants, substances enabling diagnostics, substances which are able to etch tooth substance and/or with adhesive effect such as, e.g., MDP or A-MDP, fluoridation agents, bleaching substances, desensitizers, adhesive bond promoters, dyes, color pigments, indicators, further initiators or initiator components, stabilizers, polymerization inhibitors, thixotropic aids as well as antibacterial substances or combinations of two or more thereof.

The weight portion of the additives, based on the total mass of the at least one base component and/or the at least one catalyst component, is normally 0 to 20% by weight, based on the total mass of the respective component, preferably 0.0001 to 15% by weight and particularly preferably 0.001 to 10% by weight.

An advantageous use of the polymerizable dental material according to the present invention is the production of a core build-up material, a polymerizable composite cement and/or a bulk fill composite.

Explicitly, the described kit also comprises kits which besides the described components also contain dental adhesion promoter compositions, in particularly single-component compositions, for the pretreatment of the restoration surface (e.g., glass ceramic, oxide ceramic, metal). Preferably, these further primers consist of (i) one or more alkoxysilane monomers (e.g., MPS) and/or (ii) one or more acidic monomers (e.g., phosphoric acid ester or carboxylic acid ester monomer (e.g., MDP and 4-META)) and/or (iii) one or more sulfur containing monomers (e.g., 6-(4-vinylbenzyl-n-propyl)amino-1,3,5-triazine-2,4-dithiol (in short, VBATDT)) and/or one or more stabilizers such as BHT and/or MEHQ and (v) an organic solvent.

Therefore, possible are compositions as dental adhesion material, as dental composite resin, as dental cement or the like which contain a radically polymerizable monomer without acidic group, an organic hydroperoxide compound, preferably with 5 or more carbon atoms with at least one hydroperoxide group which is bonded to a tertiary carbon, a thiourea system as well as fillers. In addition, an acidic component is contained which approximately is added in a weight portion which corresponds to the sum of the masses of the monomer, the hydroperoxide and the thiourea system. Here, the catalyst paste A comprises the organic hydroperoxide and the radically polymerizable monomer which is preferably methyacrylate as well as fillers. The base paste B comprises the thiourea and also the same or another radically polymerizable monomer which is preferably methyacrylate as well as fillers.

Examples of the radically polymerizable monomer without acidic group are an aromatic radically polymerizable monomer (without acidic group) and an aliphatic radically polymerizable monomer without acidic group.

A radically polymerizable monomer without acidic group may be monofunctional, bifunctional or trifunctional, or it may be characterized by a still higher functionality. Examples of the monofunctional, aromatic, radically polymerizable monomer without acidic group are benzyl (meth) acrylate, phenoxyethyl (meth)acrylate, phenoxydiethylene glycol (meth)acrylate, phenoxy-polyethylene glycol (meth) acrylate, 2-hydroxy-3-phenoxypropyl (meth)acrylate, 2-(meth)acryloyloxyethyl-2-hydroxyethyl-phthalic acid, neopentylglycol-(meth)acrylic acid-benzoic acid. Examples are esters. The bifunctional, aromatic, radically polymerizable monomer which does not contain an acidic group has a hydroxyl group in the molecule) and a hydroxyl group in the molecule.

The preferred amount of the monomer, in particularly of a hydrophilic monomer, in catalyst paste and base paste is between 0.1 and 20% by weight, preferably 5 to 15% by weight.

The hydroperoxide compound with preferably 5 or more carbon atoms and at least one hydroperoxide group which is bonded to the tertiary carbon is a component which is used as oxidizing agent for the redox polymerization initiator.

Examples of the hydroperoxide compound used in this invention with 5 or more carbon atoms which comprises at least one hydroperoxide group which is bonded to a tertiary carbon are isopropylbenzene hydroperoxide, t-amyl hydroperoxide, 1,1,3,3-tetramethylbutyl hydroperoxide, 2,5-dimethyl-2,5-di-(hydroperoxy)hexane, p-diisopropylbenzene monohydroperoxide, p-menthane hydroperoxide, pinane hydroperoxide. These can be used alone or in combination of two or more. Among them, it is preferred to use isopropylbenzene hydroperoxide, cumene hydroperoxide and/or 1,1,3,3-tetramethylbutyl hydroperoxide.

The mixture amount of the hydroperoxide compound is preferably 0.01 to 10% by weight, more preferably 0.05 to 5% by weight of the total mass.

Pyridylthiourea or its derivative is a component which is preferably used as said thiourea which serves as reducing agent for the redox polymerization initiator. The pyridylthiourea or its derivative is not particularly limited as long as the thiourea has a pyridyl group as substituent and a compound of the following formula is used. Particularly preferred is (2-pyridyl)thiourea.

The amount of the pyridylthiourea or its derivative in the total mass is preferably 0.003 to 5% by weight, more preferably 0.008 to 1% by weight, based on the total mass.

As fillers also here the already described fillers are used.

It is conceivable to add an acidic compound in addition which activates the hydroperoxide compound. But when the hydroperoxide compound is activated too strongly, then the storage stability and the operating time of the adhesion kit are impaired. Therefore, in the present invention, the mixture amount is limited. Examples for the acidic compound are the phosphoric acid group, phosphoric acid monoester group, pyrophosphoric acid group, thiophosphoric acid group, phosphonic acid group, phosphonic acid monoester group, carboxylic acid group, acid anhydride group, sulfonic acid group, sulfur. Examples for that are organic compounds with an acid group, such as, e.g., an acid group, and inorganic acids, such as, e.g., hydrochloric acid, nitric acid, sulfuric acid and phosphoric acid.

In addition, here, it is possible to add vanadium and/or copper compounds. These polymerization catalysts preferably are present in the base paste B. Examples of the vanadium compound are vanadium acetylacetonate, vanadyl acetylacetonate, vanadyl stearate, vanadium naphthenate, vanadium benzoylacetonate, vanadyl oxalate, bis(maltolate) oxovanadium(IV), oxobis(1-phenyl-1),3-butanedionate) vanadium(IV), vanadium(V) oxytriisopropoxide, ammonium metavanadate(V), sodium metavanadate(V), vanadium pentoxide (V), ditetraoxide. Examples for that are vanadium(IV) and vanadyl sulfate (IV). Solubility of the specific compound is a prerequisite. A combination of the different vanadium compounds among each other is possible.

Preferably, the copper compound is a compound which is soluble in a radically polymerizable monomer. Specific examples for that are copper acetate, copper isobutyrate, copper gluconate, copper citrate, copper phthalate, copper tartrate, copper oleate, copper octylate, copper octenoate, copper naphthenate, methacrylate acid copper, 4-cyclohexylbutyrate copper; β-diketone copper: acetylacetone copper, trifluoroacetylacetone copper, hexafluoroacetylacetone copper, 2,2,6,6-tetramethyl-3,5-heptanedionate copper, benzoylacetone copper; β-ketoester copper as copper acetoacetate; copper alkoxide as copper methoxide, copper ethoxide, copper isopropoxide, copper 2-(2-butoxyethoxy)ethoxide, copper 2-(2-methoxyethoxyethoxy)ethoxide; dithiocarbamic acid as copper, copper dimethyldithiocarbamate; salts of copper and inorganic acids.

In addition, it is possible to use phase transfer catalysts such as already described.

In both described kit systems, in addition, it has been shown to be favorable, when an additional oxidizing agent is used. Here, particularly preferable are persulfates such as alkali persulfates, e.g., sodium persulfate, potassium persulfate, or alkaline earth persulfates such as, e.g., calcium persulfate and ammonium persulfate. Also preferred are percarbonates such as alkali percarbonate, e.g., sodium percarbonate, potassium percarbonate, or alkaline earth percarbonates or ammonium percarbonates. Also preferred are perborates such as alkali perborates, e.g., sodium perborate, alkaline earth perborates or ammonium perborates or also metal peroxides such as alkali peroxides, e.g., lithium peroxide, sodium peroxide, potassium peroxide, or alkaline earth peroxides.

Therefore, the invention also relates to a modular system (kit of parts) comprising the above-described components primer (single-component primer) and dental material (single- or two-component composite) and optionally further primers.

In each of the modular systems (kits of parts) or, in short, kits—independently of the monomers used in the primer—it seems reasonable to use for the other component, the bulk fill composites, long-chain monomers for reducing stress and shrinkage. These may be composed of a long-chain spacer group (e.g., alkyl, cycloalkyl and/or arylether group, polybutadiene, polyethylene glycol, polypropylene glycol, polytetrahydrofuran), wherein on a side chain thereof or terminally at least one polymerizable group, e.g., (meth)acrylate, (meth)acrylamide, allyl, styrene, is attached. In addition, between spacer group and the polymerizable group (s) further connecting groups such as, for example, urethane, amide, carbonic acid ester or carboxylic acid ester groups may be contained. Furthermore, by the integration of one or more skeleton structures (the tabular list of possible skeleton structures) at any position between spacer, connecting group and/or polymerizable group the functionality can be increased further.

Preferably, in all described kits, as photoinitiators the following are suitable: alpha-diketones and their derivatives such as, for example, 9,10-phenanthrene quinone, in particularly D,L-camphor quinone, in connection with secondary and tertiary amines and/or mono- and bisacylphosphine oxides, such as diphenyl(2,4,6-trimethylbenzoyl)phosphine oxide (TPO) and phenylbis(2,4,6-trimethylbenzoyl)phosphine oxide (BAPO) as well as bis-(2,6-dichlorobenzoyl)-4-n-propylphenylphosphine oxide. Furthermore, metalorganic photoinitiators, e.g., benzoyl germanium derivatives such as bis(4-methoxybenzoyl)diethyl germanium and titanocenes such as bis[2,6-difluoro-3-(1-hydropyrrol-1-yl) phenyl] titanocene are suitable.

The invention also relates to a cured dental material which is obtained by mixing the catalyst paste (A) and the base paste (B) according to the present invention, preferably in the ratio of 1:20 to 1:1, and by polymerization of the polymerizable dental material.

The invention also relates to the use of a polymerizable dental material containing at least one above-described catalyst paste (A) and at least one above-described base paste (B) for the production of a core build-up material, a polymerizable composite cement and/or a bulk fill composite for the production of core build-ups, luting fixations and/or tooth fillings.

The invention also relates to cured dental material, wherein here only single-component systems are used for both, the primer and also the composite, for the production of a core build-up material, a polymerizable composite cement and/or a bulk fill composite for the production of core build-ups, luting fixations and/or tooth fillings.

Further developments, advantages and possible uses of the invention also arise as a result of the following description of the FIGURE and the embodiment examples. Here, all described and/or depicted features for themselves or in arbitrary combination form the subject matter of the invention independently of their summary in the patent claims or their backreferences.

Preparation of the Primer Compositions

The used raw materials BHT, DMAEMA (DMAPMA), acidic adhesive monomer (MDP, GDMAP, etc.), monofunctional monomer (HEMA, A-HEMA) as well as, dependently on the respective recipe, no or one multifunctional monomer were weighed out according to the recipes in the respective examples into a mixing can (PP 30 cup, transparent, company Hauschild, Germany) and homogenously mixed for 1 min at 3500 r/min (Speedmixer DAC 150 FVZ, company Hauschild, Germany). Subsequently, the amount of deionized water specified each in the examples was added and it was homogenized again for 1 min at 3500 r/min in the Speedmixer.

Here, the polyfunctional monomer was used in each case with the identical molar ratio, in other words in the same amount of substance.

Sample Preparation

For the testing of the adhesive bond strength broken permanent molars from humans were used so that dentin near the surface, i.e., dentin which is as close as possible to the dental enamel is used so that the fluctuations are kept as low as possible. The teeth were stored in 0.5% aqueous chloramine-T solution in the refrigerator at 2 to 8° C., and prior to the preparation of the tooth surface they were rinsed thoroughly with running water.

For the sample pretreatment the teeth are embedded in a suitable material (Vari-Kwick liquid (LOT: 2013004123)), and the surface preparation is realized by abrading in an automatic grinding machine with rotating grinding disks and automatic water supply. For that, according to ISO 6344-1, silicon carbide grinding paper with the grain size grade P400 is used for preparing an adhesive bond area which is large enough. After the abrading the embedded teeth are thoroughly rinsed with water for removing all foreign matter such as, e.g., remaining grinding grains. Then, within 4 h the prepared surfaces have to be used for the test.

For the test the tooth is rinsed for 10 s under running water. Then, water is removed with filter paper or by a soft/shortly applied jet of oil- and water-free compressed air immediately prior to the application of the adhesive. The adhesive is uniformly applied onto the whole prepared tooth surface and rubbed in for 20 s. Subsequently, the tooth is inserted into a combination screw clamp containing a white insertion mold for the composite cylinder with a hole diameter of (2.38±0.03) mm. The filling depression of the mold is centrally arranged above a position on the tooth which is suitable for the adhesive bond composite, wherein it is ensured that the adhesive bond position only consists of the intended dentin. Subsequently, the mold is lowered down to the tooth surface.

In all cases, as composite a composite prepared according to example 3 of DE 10 2015 103 427 A1 (composition 2 each) is used.

The base paste thereof has the following composition:

TABLE 1

| | base paste composition | | | |
|---|---|---|---|---|
| | Amount [% by weight] | | | |
| Ingredient | 11 | 2 | 3 | 4 |
| di-2-methacryloxyethyl-2,2,4-trimethylhexamethylene dicarbamate | 24.75 | 20.909 | 20.909 | 17.25 |
| 1,12-dodecanediol dimethacrylate | 6.25 | 8.505 | 1.00 | — |
| triethylene glycol dimethacrylate | — | — | — | 3.45 |
| glycerin dimethacrylate | — | — | 10.00 | 10.35 |
| trimethylolpropane trimethacrylate | 2.00 | 2.50 | — | — |
| Exothane 9 | — | 1.101 | 1.101 | 3.45 |
| HDK H2000 | 4.50 | 4.505 | 4.505 | 4.505 |
| YbF$_3$ (100 nm) | 20.00 | 20.00 | 20.00 | 20.00 |
| cristobalite powder (6 µm with methacrylic silane) | 39.10 | 39.471 | 39.471 | 37.58 |
| dental glass GM27884 | — | — | — | — |
| p-tolyl diethanolamine | 0.90 | 0.516 | 0.516 | 0.909 |
| (2-pyridyl)thiourea | — | — | — | — |
| ethyl 4-dimethylaminobenzoate | 0.20 | 0.20 | 0.20 | 0.20 |
| D,L-camphor quinone | 0.09 | 0.09 | 0.09 | 0.09 |
| sodium sulfite (5 µm) | 2.00 | 2.00 | 2.00 | 2.00 |
| 2,6-di-tert-butyl-4-methylphenol | 0.01 | 0.023 | 0.023 | 0.03 |
| 2-hydroxy-4-methoxy-benzophenone | 0.20 | 0.20 | 0.20 | 0.20 |
| sum: | 100.00 | 100.00 | 100.00 | 100.00 |

The catalyst paste of this composite has the following composition:

TABLE 1

| | catalyst paste composition | | | | | |
|---|---|---|---|---|---|---|
| | Amount [% by weight] | | | | | |
| Ingredient | 1 | 2 | 2B | 3 | 3B | 4 |
| di-2-methacryloxyethyl-2,2,4-trimethylhexamethylene dicarbamate | 24.75 | 20.90 | 20.90 | 20.90 | 20.90 | 16.50 |
| 1,12-dodecanediol dimethacrylate | 6.25 | 8.50 | 8.50 | 1.00 | 1.00– | — |
| triethylene glycol dimethacrylate | — | — | — | — | — | 3.30 |
| glycerin dimethacrylate | — | — | — | 10.00 | — | 9.90 |
| Exothane 9 | — | 1.10 | 1.10 | 1.10 | 1.10 | 3.30 |
| trimethylolpropane trimethacrylate | 2.00 | 2.50 | 2.50– | — | — | — |
| HDK H2000 | 2.00 | 2.00 | 2.00 | 2.00 | 2.00 | 2.00 |
| YbF$_3$ (100 nm) | 20.00 | 20.00 | 20.00 | 20.00 | 20.00 | 20.00 |
| cristobalite powder (6 µm with methacrylic silane) | 43.91 | 43.70 | 40.70 | 43.70 | — | 43.90 |
| dental glass GM27884 | — | — | — | — | — | — |
| dibenzoyl peroxide | 0.80 | 1.00 | — | 1.00 | — | 0.80 |
| cumene hydroperoxide | — | — | — | — | — | — |
| 2,6-di-tert-butyl-4-methylphenol | 0.09 | 0.10 | — | 0.10 | — | 0.10 |
| tetrabutylammonium bisulfate | 0.20 | 0.20 | — | 0.20 | — | 0.20 |
| sodium persulfate | — | — | 3.00 | 3.00 | — | — |
| sum: | 100.00 | 100.00 | 100.00 | 100.00 | 100.00 | 100.00 |

In the course of this, it is introduced into the mold and so applied onto the adhesive bond surface and cured in the drying cabinet at 37° C. for 6-7 min. Light curing with a targeted use of an external light source is not conducted.

The storage of the composite specimens over 24 (±2) h is realized in water at 37 (±2) ° C. The composite strength of the specimens is tested immediately after their removal from the water.

For each of the examples, in the described manner, 10 teeth are prepared.

Thermocycling

Subsequently, five of the ten teeth were subjected to a temperature change stress test. For that, these five specimens were subjected in a thermocycling instrument (Thermocycler THE 1200, company SD Mechatronik GmbH, Feldkirchen-Westerham, Germany) to a thermomechanical load by 5000 cycles in an alternating bath between 5 (±1) ° C. cold and 55 (±1) ° C. warm water. Here, the specimens remained in each of both baths for 30 s, and between there was a drip-off time of 5 s.

Measurement of the Adhesion Value

The measured adhesion values were determined by means of a shearing off test method with which the shearing off composite strength between the dental material and the tooth structure can be measured. This method is described for dental adhesives in the standard DIN EN ISO 29022.

As testing instrument, a "shearing off device with recessed blade" (Zwick universal testing machine, Zwick, Ulm, Germany) was used. Immediately after the removal from the water, the composite specimen is clamped into the sample holder made of metal. Onto the specimen with a transversal main speed of 1.0 mm/min a load is applied, until the specimen breaks, and the maximum force (F) before the breakage of the composite is recorded. The shear adhesive strength (shear stress) is calculated with the following equation:

$$\sigma = F^2 \cdot A^{-1} \text{ with}$$

σ: shear stress in MPa (megapascal)
F: measured maximum force in N
A: adhesive bond area, given in mm²

By the predefined diameter of the composite cylinder of 2.38 mm, for all conducted measurements the adhesive bond area is 4.45 mm².

The measurement was conducted for the five of the 10 teeth directly after the described storage for determining an initial adhesion value. Then, in the same manner, those five teeth were measured which before have been subjected to the thermocycling. The single values of the shear adhesive strength as well as mean value and standard deviation of all five measurements were determined and recorded. Here, a fluctuation of the measuring accuracy of about 4 MPa has been shown. The following values in the examples represent in each case the mean values over the five specimens in question.

Example 1

No polyfunctional compound is used. Therefore, example 1 is not according to the present invention.

In the described manner,
20% by weight of MDP with the following structure

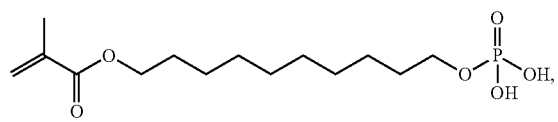 [SMILES: C=C(C)C(=O)OCCCCCCCCCCOP(=O)(O)O]

49.7% by weight of HEMA with the following structure

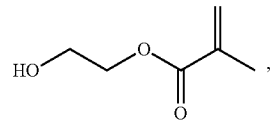

0.1% by weight of butyl hydroxy toluene (BHT) with the following structure

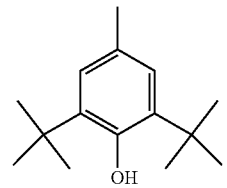 [SMILES: Cc1cc(C(C)(C)C)c(O)c(C(C)(C)C)c1]

and
0.2% by weight of 2-(dimethylamino)ethyl methylacrylate with the following structure

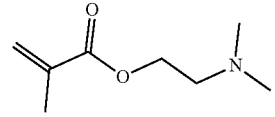

are mixed, at first alone and then together with 30% by weight of water.

The mean adhesion value on average was initially 18.0 MPa, but it decreased after the described thermocycling to 8.0 MPa. This decreasing value shows that the adhesive bond is not suitable for a permanent use in the mouth of a patient, because no sufficient adhesive effect is guaranteed.

Example 2

As polyfunctional compound glycerol propoxylate triacrylate with the following structural formula is used:

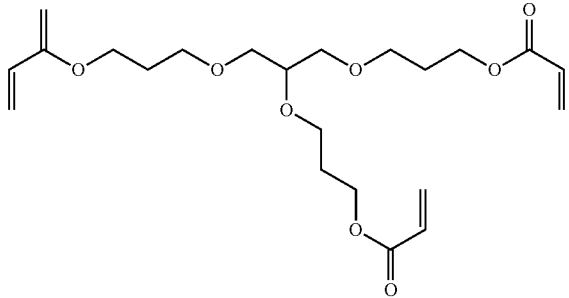 [SMILES: C=CC(=C)OCCCOCC(COCCCOC(=O)C=C)OCCCOC(=O)C=C]

In the described manner, 20% by weight of MDP, 47.2% by weight of HEMA, 0.1% by weight of BHT and 0.2% by weight of 2-(dimethylamino)ethyl methylacrylate as well as 2.5% by weight of glyceryl propoxy triacrylate as triacrylate are mixed, at first alone and then together with 30% by weight of water.

The mean adhesion value on average was initially 10.4 MPa, and it increased after the described thermocycling to a value of 12.2 MPa. Here, the adhesive bond is not only guaranteed in the long term, but rather it still improves over the simulated ageing cycle.

Example 3

As polyfunctional compound pentaerythritol dimethylacrylate in a mixture of ca. 25% by weight of mono-, 50% by weight of di- and 25% by weight of trimethacrylate with the following structural formula is used:

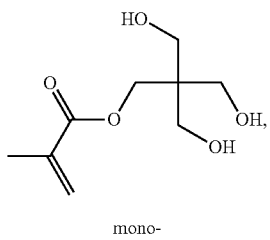

mono-

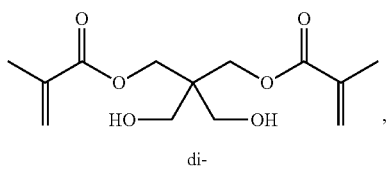

di-

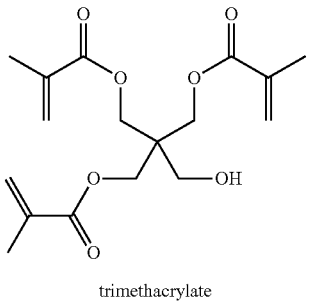

trimethacrylate

In the described manner, 20% by weight of MDP, 48.1% by weight of HEMA, 0.1% by weight of BHT and 0.2% by weight of 2-(dimethylamino)ethyl methylacrylate as well as 1.6% by weight of pentaerythritol dimethacrylate as dimethacrylate are mixed, at first alone and then together with 30% by weight of water.

The mean adhesion value on average was initially 12.8 MPa, and it increased after the described thermocycling to a value of 14.4 MPa. Also here, the adhesive bond is not only guaranteed in the long term, but rather it still improves over the simulated ageing cycle.

Example 4

As polyfunctional compound trimethylpropane trimethacrylate with the following structural formula is used:

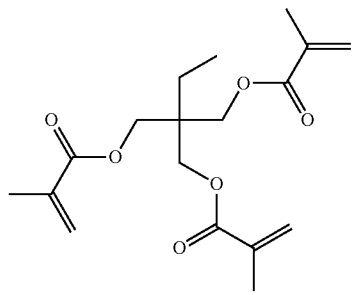 [SMILES: C=C(C)C(=O)OCC(CC)(COC(=O)C(=C)C)COC(=O)C(=C)C]

In the described manner, 20% by weight of MDP, 47.7% by weight of HEMA, 0.1% by weight of BHT and 0.2% by weight of 2-(dimethylamino)ethyl methylacrylate as well as 2% by weight of trimethylpropane trimethacrylate as trimethacrylate are mixed, at first alone and then together with 30% by weight of water.

The mean adhesion value on average was initially 20.1 MPa, and then it slightly decreased after the described thermocycling to a value of 17.1 MPa. These adhesion values are considerably better than the limiting value of 10 MPa which is normally applied so that also these values guarantee a very good adhesive bond between tooth and polymerizable dental material in the long term.

Example 5

As polyfunctional compound trimethylolpropane trimethacrylate with the following structural formula is used:

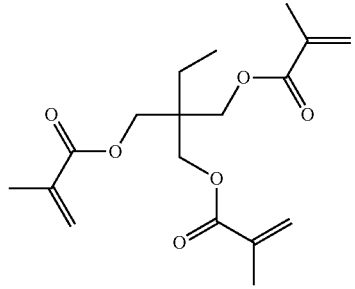 [SMILES: C=C(C)C(=O)OCC(CC)(COC(=O)C(=C)C)COC(=O)C(=C)C]

Deviating from example 4, MDP is replaced by GDMAP, so that in the described manner 19.1% by weight of GDMAP, 48.6% by weight of HEMA, 0.1% by weight of BHT and 0.2% by weight of 2-(dimethylamino)ethyl methylacrylate as well as 2% trimethylpropane trimethacrylate as trimethacrylate are mixed, at first alone and then together with 30% by weight of water.

The mean adhesion value on average was initially 12.7 MPa, and then it increased after the thermocycling to a value of 15.7 MPa.

Example 6

As polyfunctional monomer pentaerythritol trimethacrylate with the following structural formula is used:

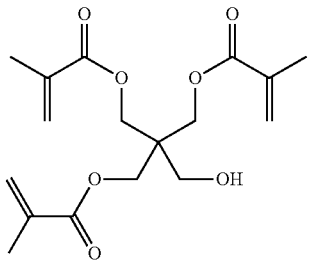 [SMILES: C=C(C)C(=O)OCC(CO)(COC(=O)C(=C)C)COC(=O)C(=C)C]

In the described manner, 20% by weight of MDP, 47.7% by weight of HEMA, 0.1% by weight of BHT and 0.2% by weight of 2-(dimethylamino)ethyl methylacrylate as well as 2% by weight of pentaerythritol trimethacrylate as trimethacrylate are mixed, at first alone and then together with 30% by weight of water.

The mean adhesion value on average was initially 22.3 MPa, and then it decreased after the described thermocycling to a value of 16.9 MPa. These adhesion values are considerably better than the limiting value of 10 MPa which is normally applied so that also these values guarantee a very good adhesive bond between tooth and polymerizable dental material in the long term.

Example 7

As polyfunctional compound sorbitol pentamethacrylate with the following structural formula is used:

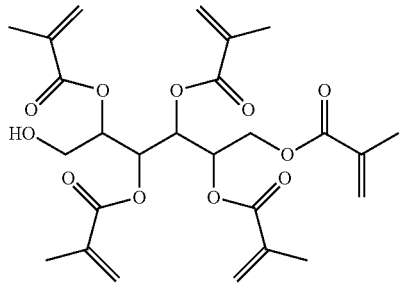 [SMILES: C=C(C)C(=O)OCC(OC(=O)C(=C)C)C(OC(=O)C(=C)C)C(OC(=O)C(=C)C)C(CO)OC(=O)C(=C)C]

In the described manner, 20% by weight of MDP, 46.6% by weight of HEMA, 0.1% by weight of BHT and 0.2% by weight of 2-(dimethylamino)ethyl methylacrylate as well as 3.1% by weight of sorbitol pentamethacrylate as pentamethacrylate are mixed, at first alone and then together with 30% by weight of water.

The mean adhesion value on average was initially 16.9 MPa, and then it increased after the described thermocycling to a value of 17.3 MPa. These adhesion values are both considerably higher than the limiting value of 10 MPa so that also this system guarantees a very good adhesive effect.

Example 8

As polyfunctional compound aliphatic urethane hexaacrylate (GENOMER* 4691® Rahn AG) with the following assumed structural formula is used:

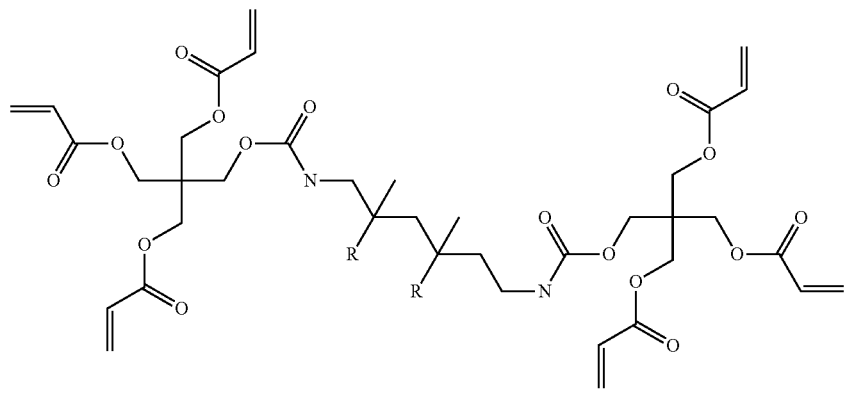

R = H or CH$_3$ (1:1)

In the described manner, 20% by weight of MDP, 45.9% by weight of HEMA, 0.1% by weight of BHT and 0.2% by weight of 2-(dimethylamino)ethyl methylacrylate as well as 3.8% by weight of aliphatic urethane hexaacrylate as hexaacrylate are mixed, at first alone and then together with 30% by weight of water.

The mean adhesion value on average was initially 14.9 MPa, and then after the described thermocycling 18.3 MPa. Thus, again, here a very good permanent adhesion is guaranteed.

Table 3 shows an overview of the different adhesion values for different polyfunctional compounds:

| Example No. | Polyfunct. compound | Structural formula | Adhesive effect, initially, in MPa | Adhesive effect, after TC, in MPa |
|---|---|---|---|---|
| 1 | — | — | 18.0 | 8.0 |
| 2 | glycerol propoxylate triacrylate | 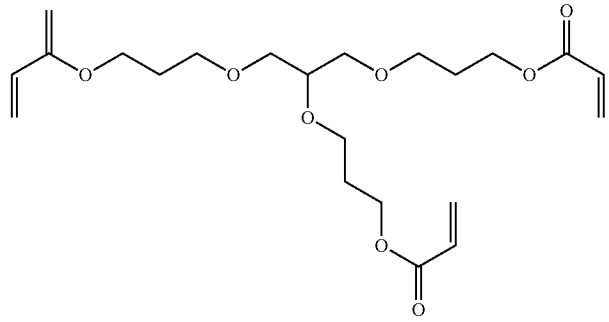 [SMILES: C=CC(=C)OCCCOCC(COCCCOC(=O)C=C)OCCCOC(=O)C=C] | 10.4 | 12.2 |
| 3 | pentaerythritol trimethylacrylate | 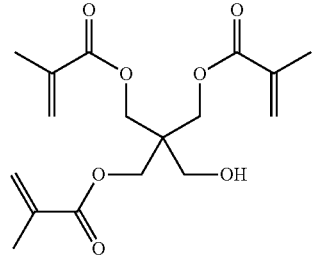 [SMILES: C=C(C)C(=O)OCC(CO)(COC(=O)C(=C)C)COC(=O)C(=C)C] | 12.8 | 14.4 |
| 4 | trimethylpropane trimethacrylate | 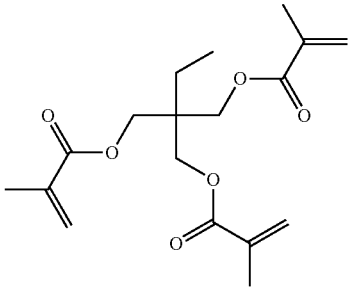 [SMILES: C=C(C)C(=O)OCC(CC)(COC(=O)C(=C)C)COC(=O)C(=C)C] | 20.1 | 17.1 |
| 5 | trimethylolpropane trimethacrylate | 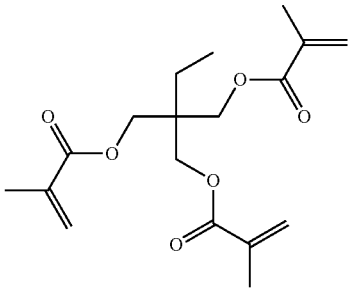 [SMILES: C=C(C)C(=O)OCC(CC)(COC(=O)C(=C)C)COC(=O)C(=C)C] | 12.7 | 15.7 |

-continued

| Example No. | Polyfunct. compound | Structural formula | Adhesive effect, initially, in MPa | Adhesive effect, after TC, in MPa |
|---|---|---|---|---|
| 6 | pentaerythritol trimethacrylate | | 22.3 | 16.9 |
| 7 | sorbitol pentamethacrylate | | 16.9 | 17.3 |
| 8 | aliphatic urethane hexaacrylate | R = H or CH$_3$ (1:1) | 14.9 | 18.3 |

* with GDMAP instead of MDP

Example 9

As polyfunctional compound a tetrafunctional alkoxylated pentaerythritol tetramethacrylate with the following structural formula is used:

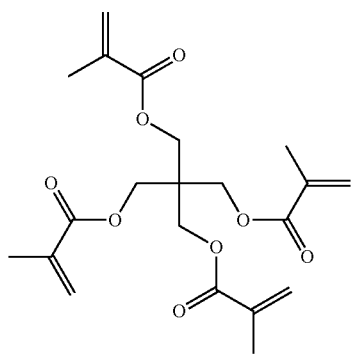 [SMILES: C=C(C)C(=O)OCC(COC(=O)C(=C)C)(COC(=O)C(=C)C)COC(=O)C(=C)C]

In the described manner, 20% by weight of MDP, 46.1% by weight of HEMA, 0.1% by weight of BHT and 0.2% by weight of 2-(dimethylamino)ethyl methylacrylate as well as 3.6% by weight of tetrafunctional alkoxylated pentaerythritol tetramethacrylate as tetramethacrylate are mixed, at first alone and then together with 30% by weight of water.

The mean adhesion value on average was initially 11.0 MPa, and after the described thermocycling 12.3 MPa. Here, the adhesive bond is not only guaranteed in the long term, but rather it still improves over the simulated ageing cycle.

Example 10

As polyfunctional compound analogously to example 4 trimethylolpropane trimethacrylate with the following assumed structural formula is used:

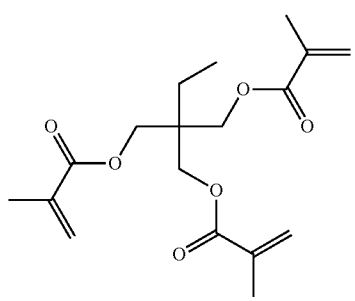 [SMILES: C=C(C)C(=O)OCC(CC)(COC(=O)C(=C)C)COC(=O)C(=C)C]

This test series shall show the influence of the portion of the phosphorus-acidic 10-methacryloyloxydecyl dihydrogen phosphate (MDP) and/or the accelerator 2-(dimethylamino)ethyl methacrylate (DMAEMA) onto the adhesive effect of the resulting composite. For 100%, the portion of 2-hydroxyethyl methacrylate (HEMA) was adjusted accordingly. The results are summarized in the following table 3.

TABLE 3 overview of adhesive effect in the case of different amounts of MDP and HEMA

| MDP in % by weight | HEMA in % by weight | DMAEMA in % by weight | Adhesive effect, initially, in MPa | Adhesive effect, after TC, in MPa |
|---|---|---|---|---|
| 20.0 | 47.9 | 0.0 | 15.7 | 15.6 |
| 10.0 | 57.7 | 0.2 | 15.4 | 8.0 |
| 20.0** | 47.7 | 0.2 | 20.1 | 17.1 |
| 30.0 | 37.7 | 0.2 | 18.5 | 18.2 |
| 40.0 | 27.7 | 0.2 | 17.1 | 16.1 |

**reference example

It has been shown that the presence of 2-(dimethylamino)ethyl methacrylate positively influences the adhesive effect, both, initially and also after the thermocycling. The best results are achieved with a 10-methacryloyloxydecyl dihydrogen phosphate in the case of about 20-30%.

Example 11

As polyfunctional compound analogously to example 4 trimethylolpropane trimethacrylate with the following assumed structural formula is used:

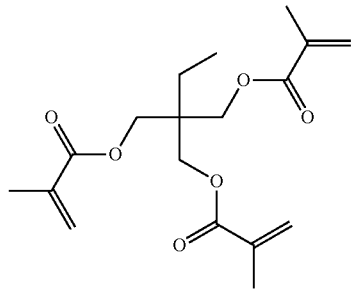 [SMILES: C=C(C)C(=O)OCC(CC)(COC(=O)C(=C)C)COC(=O)C(=C)C]

In the described manner, 20% by weight of MDP, 47.7% by weight of HEMA, 0.1% by weight of BHT and 0.2% by weight of 2-(dimethylamino)ethyl methylacrylate as well as 2% by weight of trimethylpropane trimethacrylate as trimethacrylate are mixed, at first alone and then together with 30% by weight of water.

Then, the primer was tested with the above-described base/catalyst pastes 1-4. The results are summarized in the following table 4.

TABLE 4 influence onto different systems of base and catalyst pastes

| Primer | Base/Catalyst paste | Adhesive effect, initially, in MPa | Adhesive effect, after TC, in MPa |
|---|---|---|---|
| 4 | 1 | 11.4 | 12.3 |
| 4 | 2** | 20.1 | 17.1 |
| 4 | 3 | 23.6 | 19.3 |
| 4 | 4 | 23.0 | 28.3 |

**reference example

It has been shown that the mean initial adhesion value in the case of the strongly hydrophilic composites 3 and 4 in contrast to the relatively hydrophobic base/catalyst pastes 1 is considerably increased.

The mean adhesion value on average was initially 14.9 MPa, and after the described thermocycling (TC) 18.3 MPa. Thus, again, here a very good permanent adhesion is guaranteed. The influence of the hydrophilicity, in particular after the described thermocycling, can be clearly seen.

Example 12

As polyfunctional compound analogously to example 4 trimethylolpropane trimethacrylate with the following assumed structural formula is used:

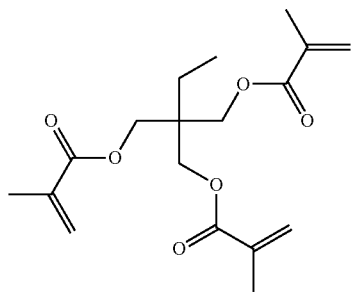

This test series shall show the influence of the accelerators copper(II) acetylacetonate and iron(III) EDTA in the presence of sodium persulfate onto the adhesive effect of the resulting composite. For 100%, the portion of 2-hydroxyethyl methacrylate (HEMA) was adjusted correspondingly.

Copper containing primer (Cu): In the described manner, 20% by weight of MDP, 47.2% by weight of HEMA, 0.1% by weight of BHT, 0.2% by weight of 2-(dimethylamino) ethyl methylacrylate and 2% by weight of trimethylpropane trimethacrylate as trimethacrylate as well as 0.5% by weight of copper(II) acetylacetonate are mixed, at first alone and then together with 30% by weight of water.

Iron containing primer (Fe): In the described manner, 20% by weight of MDP, 47.0% by weight of HEMA, 0.1% by weight of BHT, 0.2% by weight of 2-(dimethylamino) ethyl methylacrylate and 2% by weight of trimethylpropane trimethacrylate as trimethacrylate as well as 0.7% by weight of iron(III) EDTA are mixed, at first alone and then together with 30% by weight of water.

Then, the primers were tested with the above-described base pastes 2B and 3B as well as the corresponding catalyst pastes 2 and 3. The results are summarized in the following table 5.

TABLE 5 influence onto different systems of base and catalyst pastes

| Primer | Base paste | Catalyst paste | Adhesive effect, initially, in MPa | Adhesive effect, after TC, in MPa |
|---|---|---|---|---|
| Cu | 2B | 2 | 18.3 | 16.0 |
| 4* | 2 | 2 | 20.1 | 17.1 |
| Cu | 3B | 3 | 24.1 | 25.3 |
| Fe | 3B | 3 | 26.6 | 21.6 |
| 4* | 3 | 3 | 23.6 | 19.3 |

It has been shown that the presence of copper(II) acetylacetonate and sodium persulfate results in a lower mean initial adhesion value in the case of the relatively hydrophobic base/catalyst pastes 2B/2 compared to the reference base/catalyst paste 2/2.

On the other hand, a tendency to higher mean initial adhesion values and also improved adhesion values after thermocycling compared to the reference values can be seen, when the copper containing or iron containing primer in the presence of sodium persulfate with the considerably more hydrophilic base/catalyst pastes 3B/3 is used. In particular, the combination Cu-primer/3B/3 shows an increase of the mean adhesion value from 24.1 MPa to 25.3 MPa after thermocycling, and thus a high resistance also in the case of simulated ageing.

The invention claimed is:
1. An aqueous dental primer composition, comprising
   a first polymerizable (meth)acrylate or (meth)acrylamide monomer with (i) at least one acidic group;
   a second polymerizable (meth)acrylate or (meth)acrylamide monomer with (ii) at least one hydrophilic group; and
   a third polymerizable (meth)acrylate or (meth)acrylamide monomer with (iii) a 3-, 4-, 5-, 6-, 7-, 8-, 9-, 10-polyfunctionality, and
   water in a portion of 20 to 50% by weight,
   wherein the aqueous dental primer composition is characterized by the absence of a photoinitiator, a polymerization catalyst and an organic solvent.
2. The composition according to claim 1, characterized in that the at least one acidic group is carbonate, sulfate, phosphate, phosphonate, phosphinate, or that the monomer with the acidic group is MOP, PENTA, GOMAP, MAC, 4-META, A-MOP, PMGOM, or that (poly)vinyl carboxylic acids as well as their copolymers and combinations thereof are contained.
3. The composition according to claim 1, characterized in that the hydrophilic group is a hydroxyl, an amine or a polyether group.
4. The composition according to claim 3, characterized in that the hydrophilic group is a terminal or side chain-linked hydroxyl or a terminal or side chain linked amino group or a main chain-linked polyether group.
5. The composition according to claim 1, characterized in that the (meth)acrylate or (meth)acrylamide monomer (iii) with the 3-, 4-, 5-, 6-, 7-, 8-, 9-, 10-polyfunctionality correspondingly to the respective multiple contains the corresponding number of functional groups in the form of (meth)acrylate, (meth)acrylamide, styrene and/or allyl groups.
6. The composition according to claim 1, characterized in that the third polymerizable (meth)acrylate or (meth)acrylamide monomer comprises a backbone with a structure selected from the group comprising glycerin, trimethylolpropane, pentaerythriol, xylitol, triglycerol, dipentaerythritol, sorbitol, hydrocarbons, cycloalkanes, aliphatic polyethers, PEG, PPG, PTMEG, paraformaldehyde and unbranched or branched hydrocarbons.
7. The composition according to claim 1, characterized by the absence of vanadium compounds.
8. The composition according to claim 1, characterized in that the dental primer composition is a single-component composition.
9. The composition according to claim 1, characterized in that the pH value of the composition has a value of ≤3.5.
10. The composition according to claim 1, characterized in that the portion of the third polymerizable (meth)acrylate or (meth)acrylamide monomer is between 0.1 and 10% by weight.
11. The composition according to claim 1, characterized in that MDP is contained in a portion of 15 to 35% by weight and HEMA is contained in a portion of 35 to 60% by weight.

12. The composition according to claim 11, characterized in that the third polymerizable (meth)acrylate or (meth)acrylamide monomer is present in the composition in dissolved form.

13. The composition according to claim 1 characterized in that 0.005 to 1% by weight of BHT and/or hydroquinone monomethyl ether (MEHQ), pyrocatechol derivatives and/or HALS (sterically hindered amines) and/or 0.05 to 5% by weight of 2-(dimethylamino)ethyl methacrylate is/are contained.

14. A dental adhesive material kit, comprising the aqueous dental primer composition according to claim 1 and a pasty, polymerizable two-component dental material, containing a catalyst paste (A) and a base paste (B), wherein the catalyst paste (A) contains at least one organic peroxygen compound, at least one radically polymerizable organic (meth)acrylate monomer and at least one filler, and wherein the base paste (B) contains at least one radically polymerizable organic (meth)acrylate monomer, an amine as co-initiator of the radical polymerization, at least one filler and at least one saltlike, water-soluble and powdery reducing agent being dispersed therein.

15. A dental adhesive material kit, comprising the aqueous dental primer composition according to claim 1 and a pasty, polymerizable two-component dental material, containing a catalyst paste (A) and a base paste (B), wherein the catalyst paste (A) contains at least one organic peroxygen compound, at least one radically polymerizable organic (meth)acrylate monomer and at least one filler, and wherein the base paste (B) contains at least one radically polymerizable organic (meth)acrylate monomer, an amine as co-initiator of the radical polymerization, at least one filler and at least one saltlike, water-soluble and powdery reducing agent being dispersed therein, wherein the catalyst paste (A) and/or the base paste (B) contains at least one phase transfer catalyst which is selected from the group of the ammonium, phosphonium and/or sulfonium salts which contain an inorganic or organic anion, with the proviso that the phase transfer catalyst in the case of organic anions comprises only such ones with 1-4 carbon atoms and that anions of the sulfinic acids and sulfonic acids are excluded.

16. The dental adhesive material kit according to claim 15, characterized in that the phase transfer catalyst is only present in the catalyst paste (A) and/or that the portion of the at least one phase transfer catalyst, based on the total mass of the catalyst paste (A) and/or the base paste (B), is 0.01 to 5% by weight.

17. The dental adhesive material kit according to claim 15, characterized in that the at least one salt-like, water-soluble and powdery reducing agent is selected from the group of the sulfites and/or that the co-initiator of the radical polymerization is a primary, secondary or tertiary amine.

18. The dental adhesive material kit according to claim 15, characterized in that it is a dual-curing one and that in addition at least one photoinitiator is provided in the catalyst paste (A) and/or in the base paste (B).

19. The dental adhesive material kit according to claim 15, characterized in that the (meth)acrylate monomer is provided in the catalyst paste (A) and/or in the base paste (B) in an amount of between 10 and 80% by weight.

20. The dental adhesive material kit according to claim 15, characterized in that the at least one radically polymerizable organic (meth)acrylate monomer is selected from the group of the di- or higher acrylates, di- or higher acrylamides, di- or higher methacrylates and/or the di- or higher methacrylamides, or that the at least one radically polymerizable organic (meth)acrylate monomer is selected from the group of the aromatic groups containing acrylates or methacrylates, aliphatic groups containing acrylates or methacrylates, polyether groups containing acrylates or methacrylates, hydroxyl and/or amino groups containing aliphatic or aromatic (meth)acrylate monomers, polyester groups containing acrylates or methacrylates, polyurethane groups containing acrylates or methacrylates or combinations of two or more of these monomers, or that the at least one radically polymerizable organic (meth)acrylate monomer is selected from the group of the monomers bisphenol A diacrylate, bisphenol A dimethacrylate, bisphenol glycidyl acrylate, bisphenol glycidyl methacrylate (Bis-GMA), ethoxylated bisphinol A diacrylate, ethoxylated bisphenol A dimethacrylate, 1,6-bis(acryloxy-2-ethoxycarbonylamino)-2,4,4-trimethylhexane, 1,6-bis(methacryloxy-2-ethoxycarbonylamino)-2,4,4-trimethylhexane (UDMA), trimethylolpropane triacrylate, trimethylolpropane trimethacrylate (TMPTMA), 2-hydroxyethyl acrylate, 3-hydroxypropylacrylate, 2-hydroxyethyl methacrylate (HEMA), 3-hydroxypropyl methacrylate, glycerin-1,3-acrylate, glycerin-1,3-dimethacrylate (GDMA), 1,2-ethanediylbis(oxy-2-hydroxy-3,1-propanediyl)-bis(2-methylacrylate), 1,12-dodecanediol diacrylate, 1,12-dodecanediol dimethacrylate, triethylene glycol diacrzlate, triethylene glycol dimethacrylate, tetraethylene diacrylate, tetraethylene glycol dimethacrylate or combinations of two or more of these monomers, or that the radically polymerizable organic (meth)acrylate monomers are free of structural units with aromatic groups.

21. The dental adhesive material kit according to claim 15 characterized in that the organic peroxygen compound is selected from the group of the organic peroxides.

22. The dental adhesive material kit according to claim 15, characterized in that the anion of the phase transfer catalyst is selected from the group of the halogenides, the hydroxides, the anions of organic acids, the pseudohalogen anions or the halogen complexes of aluminate, silicate or phosphate, or the anions of organic acids with 1-4 carbon atoms, excluded anions of sulfinic acids and the sulfonic acids.

* * * * *